3 Sheets—Sheet 1.

A. KNOWLTON.
Nailing-Machine.

No. 224,339. Patented Feb. 10, 1880.

Witnesses.
L. F. Connor
Jos. P. Livermore

Inventor
Albion Knowlton,
by Crosby Gregory Atty.

A. KNOWLTON.
Nailing-Machine.
No. 224,339. Patented Feb. 10, 1880.
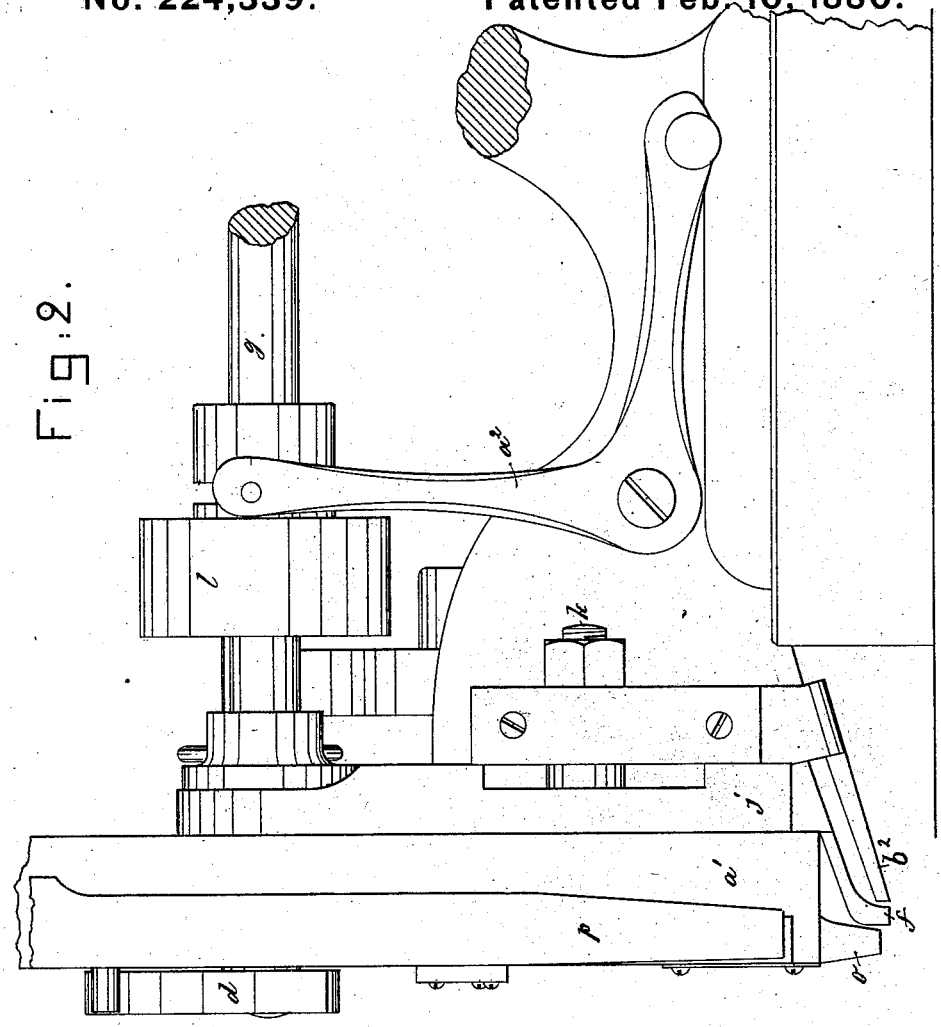
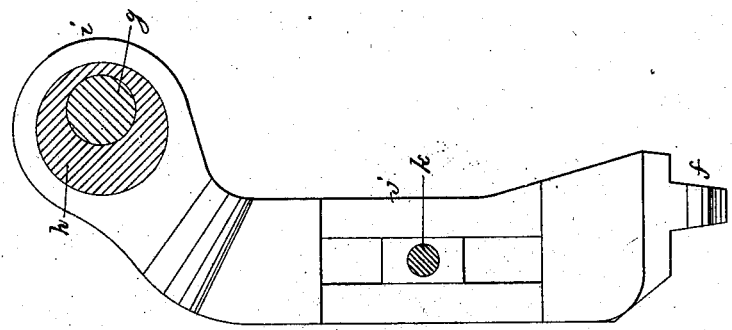
Witnesses.
L. F. Connor.
Jos. P. Livermore.
Inventor.
Albion Knowlton,
by Crosby & Gregory, Attys 3 Sheets—Sheet 3.

A. KNOWLTON.
Nailing-Machine.

No. 224,339. Patented Feb. 10, 1880.

Witnesses.
L. F. Connor.
Jas. P. Livermore.

Inventor.
Albion Knowlton,
by Crosby & Gregory, Attys.

UNITED STATES PATENT OFFICE.

ALBION KNOWLTON, OF BOSTON, MASSACHUSETTS.

NAILING-MACHINE.

SPECIFICATION forming part of Letters Patent No. 224,339, dated February 10, 1880.

Application filed December 26, 1879.

*To all whom it may concern:*

Be it known that I, ALBION KNOWLTON, of Boston, county of Suffolk, State of Massachusetts, have invented an Improvement in Nailing-Machines, of which the following description, in connection with the accompanying drawings, is a specification.

This invention relates to mechanism for nailing boots and shoes; and the invention consists, essentially, in providing such a machine with a feeding mechanism to engage and intermittingly move for a greater or less distance the wire to be formed into nails or tacks of different length, according to the length desired for each nail, and with such feeding mechanism is employed a length-gaging cam, which, by its changes of position on its actuating-shaft, determines the length of time that the feeding devices are operative during each rotation of the main shaft of the machine. This cam is placed under the control of the operator through a suitable lever or treadle, and besides governing the extent of the wire-feeding operation, also actuates the cutting and nail-carrying mechanism to sever the wire into nails of the proper length and place them in position to be driven by the driver.

Figure 1:
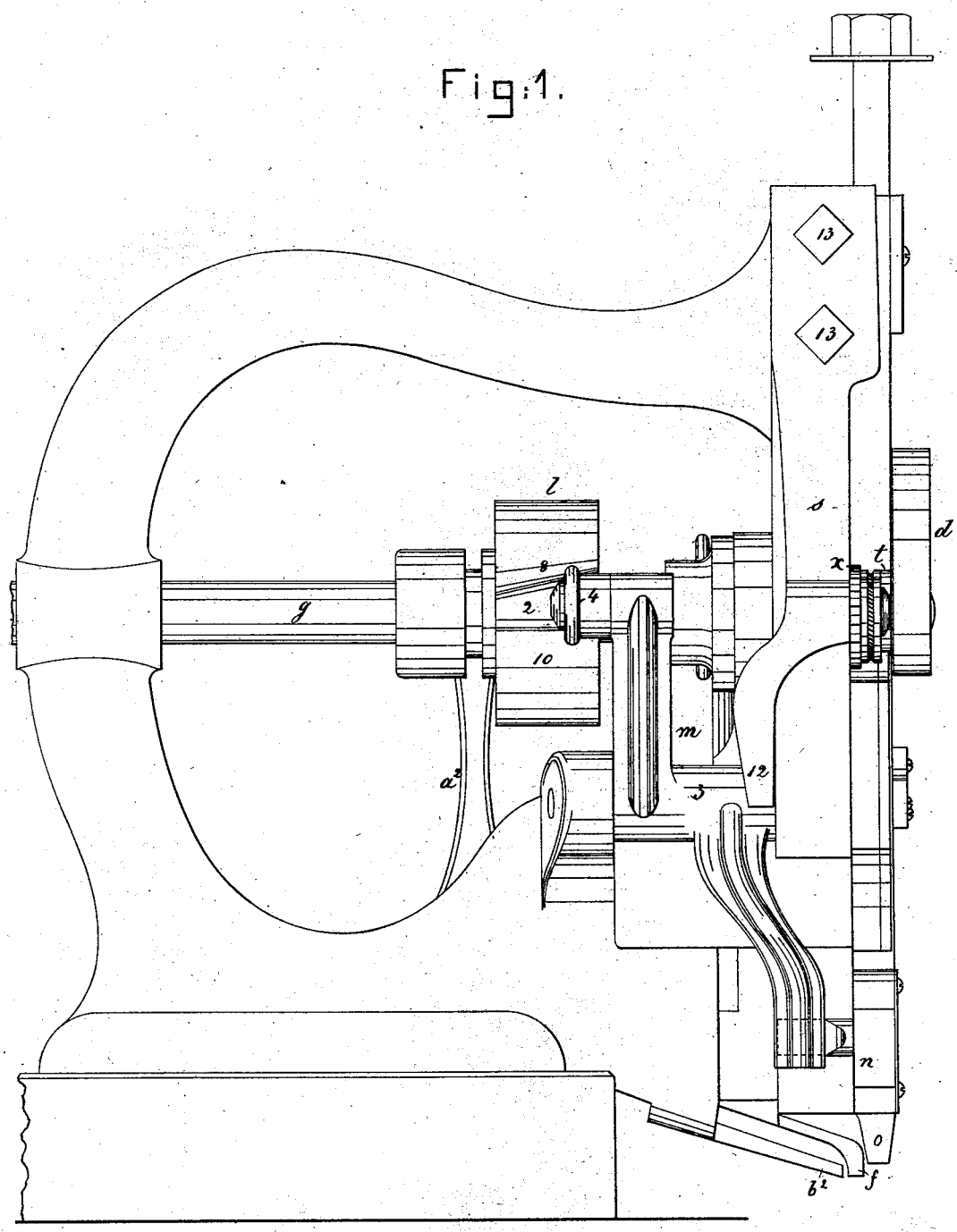
Figure 4:
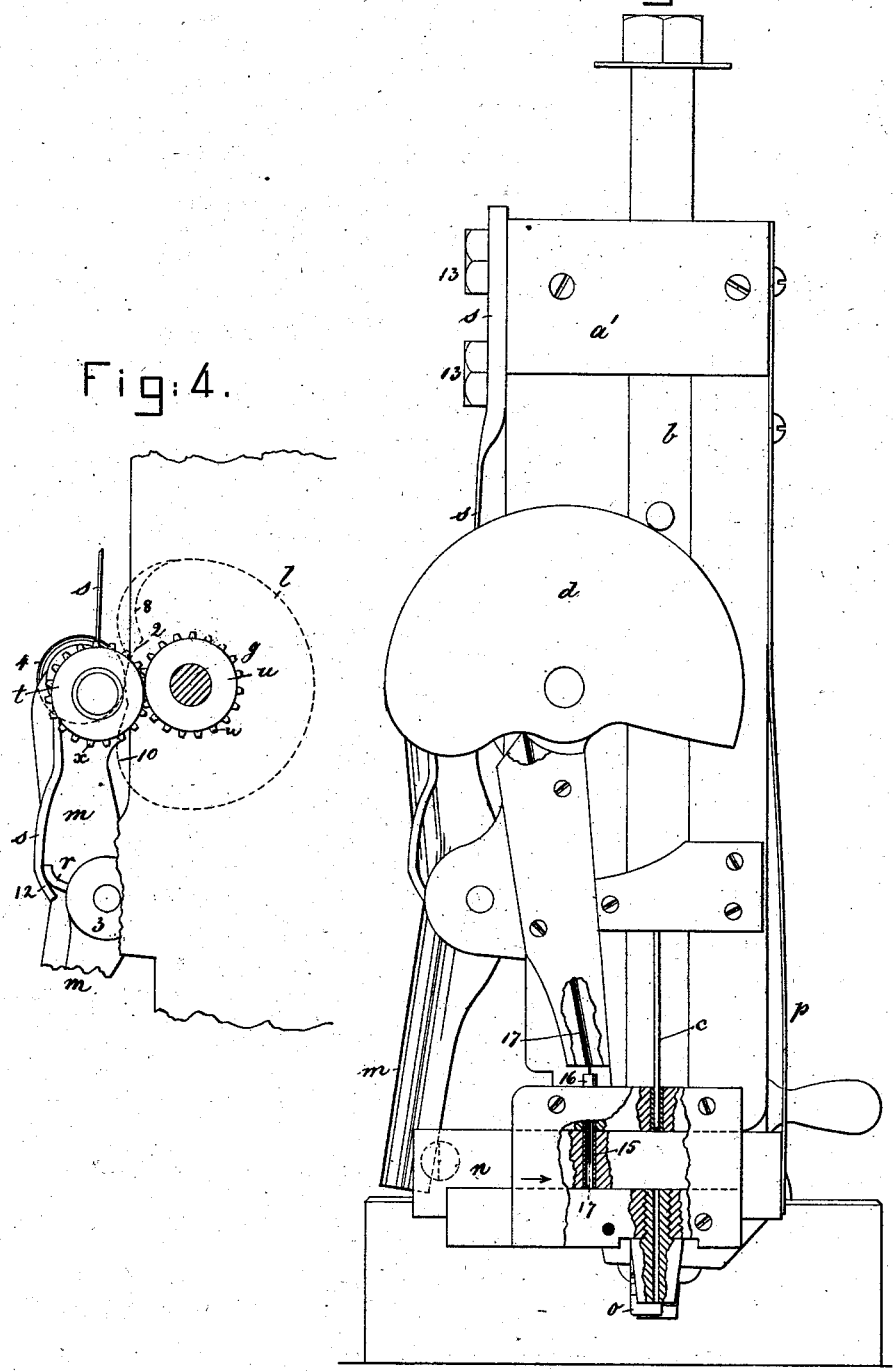

Figure 1 represents, in side elevation, a sufficient portion of a nailing-machine to illustrate my invention; Fig. 2, a view of a part of the opposite side of the machine; Fig. 3, a detail showing the shoe-feeding device. Fig. 4 is a detail representing the feeding-wheels, part of the arm $m$, and in dotted outlines the front end of the length-gaging cam; and Fig. 5 is a front view of Fig. 1.

The frame-work $a$ of the machine, the driver-bar $b$, its driver $c$, cam $d$ to operate it, and the shoe-feeding device $f$ are all substantially as now in use.

The driving-shaft $g$ of the machine, operating the driver-bar-lifting cam $d$, has fast upon it the eccentric $h$, (see Fig. 3,) which, surrounded by the eccentric-strap $i$ of the shoe-feeding lever $j$, vibrates the said lever over its adjustable fulcrum $k$, so that its end $f$ feeds the shoe or boot for the proper distance before each descent of the driver. This shaft $g$ has splined upon it the length-gaging cam $l$, one portion of which, as best seen at Fig. 1, has a tapering face, 2, concentric with the shaft $g$, which face, as shown in the said figure, is of less width toward the rear end of the said cam, but it might be just the reverse. At each side of this tapering face 2 the said cam is suitably shaped, as shown in Figs. 1 and 4, at 8, to operate the lever $m$ to cause it at the proper time to move forward the cutter-bar $n$, which is also a nail-carrier, to place the nail cut from the wire under and in line with the driver and the nail-passage in the nose $o$, and also with a surface, 10, to permit the upper end or arm of the said lever $m$ to approach the tapering face 2, as it has a tendency to do by reason of the action upon the cutter-bar of the spring $p$. This lever $m$ has two arms projecting from a central hub, 3, and the upper arm has upon it a roller, 4, with a rounded face, (see Fig. 1,) to bear against the periphery of the cam $l$ in order to make the line of its contact with the said cam as narrow as possible and enable it to operate correctly with the inclined surface 8. The said hub 3 has upon it a toe, $r$, (see Fig. 4,) which, as soon as the roller 4 is struck by the surface 8 of cam $l$ to move the lever $m$ and hub, is caused to act upon and move outward the lower end, 12, of the spring-arm $s$, connected with the head $a'$, which results in separating the wire-feeding wheel $t$ from operative contact with the wire, which is supposed to be in place between it and the opposing wire-feeding wheel $u$ at the end of the main shaft $g$. (See Fig. 4.) The feeding-wheel $u$ has connected with it a gear, $w$, which rotates the gear $x$, connected with the wire-feeding wheel or driver $t$. So long as the roller 4 bears upon the tapering face 2 the two rollers $t\ u$ are permitted to approach sufficiently near each other to firmly grasp and feed the wire; but as soon as the surface 8 of the cam $l$ strikes the said roller 4 the wire-feeding rollers, as before described, are separated, and the feed or movement of the wire is stopped.

It will be obvious that this feeding movement will be carried on for a greater or less portion of each rotation of cam $l$, according to the width of the tapering surface 2, in contact with which the roller 4 then rests, and consequently the length of the wire-feeding movement and the length of the nail will depend upon the position of the said cam $l$ upon its shaft, and by moving the same backward or forward thereon with relation to the roller 4 by the lever $a^2$ or its equivalent (a treadle under the control of the operator) the length of the wire-feeding movement and the length of the nail may be increased or lessened.

The spring-arm $s$, as the roller 4 descends along the surface 10 upon the tapering surface 2, throws the wire-feeding rollers together. The gears $w$ $x$ have teeth sufficiently long so as never to become disengaged.

The cutter-bar $n$ (see Fig. 5) has in it a hardened-steel tube, 15, (shown in section,) which, when in line with a second hardened-steel tube or cutter, 16, fixed to a stationary part of the frame, has entered into it by the wire-feeding devices the free end of the wire 17, as shown in the said Fig. 5.

The lower end or arm of the lever $m$ at the proper time strikes a pin on the said bar $n$ (see dotted lines) and moves the bar forward, cutting off between the cutters 15 16 the wire 17, leaving the piece so cut off in the tube 15 to serve for the nail next to be driven. The bar $n$ is then moved sufficiently far in the direction of the arrow upon it to place the cutter-tube 15 in line with the driver $c$, and the nail-passage in the nose $o$, when the driver is thrown down quickly by any usual spring, causing it to drive the said nail or piece of wire into the boot or shoe suitably presented under the said nose by hand or upon a jack or other support.

It will be seen that the cutter-bar-operating lever $m$, by reason of its toe $r$, causes the wire-feeding wheel $t$ to release its bite upon the wire just as the cutter begins to operate to sever the nail from the said wire, so that the wire-feed cannot operate while the cutter severs the wire and the latter is being transferred to driving position, or until the cutter 15 returns to its normal position.

It will be observed that the diameter of the wire-feeding rollers is less than the diameter of the shaft $g$ plus the distance from the said shaft to the outside of the tapering face 2. This enables me to insure greater accuracy in the length of the wire-feed and the nail than would be the case if this difference did not exist, for by such increase in length of the shaft and thickness of the tapering face 2 they are caused to travel in the same time over a greater arc than the feed-rollers, and consequently any accidental variation of feed is reduced to the minimum.

The gage $b^2$ for the edge of the sole is attached to the frame-work in any suitable or usual manner, and the acting face $f$ of the shoe-feed, which moves in an elliptical path, engages the sole between the gage and nose.

I claim—

1. In a nailing-machine, the wire-feeding mechanism, combined with the length-gaging cam having a surface to determine the extent of movement of the wire-feeding mechanism for nails of different length, substantially as described.

2. The wire feeding and cutting mechanism, combined with the adjustable length-gaging cam and lever operated by it to release the hold of the wire-feeding mechanism from the wire and operate the cutter to sever the said wire, substantially as described.

3. In a nailing-machine, the adjustable rotatable length-gaging cam provided with the tapering face 2 and surface 8, combined with the lever $m$ and its roller 4, having a rounded face, substantially as described.

4. The wire-feeding roller $t$, supported by the arm $s$, combined with the cutter-bar-actuating lever adapted to move the said roller away from the roller $u$ and stop the wire-feed as the cutter begins to sever the wire, substantially as described.

5. The cutter-bar $n$ and its hardened-steel tube, adapted to serve as the carrier to place the nail in line with the driver, combined with a stationary cutter to co-operate with the said tube in the said bar $n$, substantially as described.

6. In a nailing-machine, a cutter-bar provided with a hardened-steel tube, to co-operate with a stationary cutter to sever a nail from a wire and carry it into position below the driver $h$ to be driven, combined with the driver and driver-bar and shoe-feeding mechanism, substantially as described.

7. In a nailing-machine, an intermittingly-operating wire-feeding mechanism adapted to feed the wire for a greater or less distance, according to the desired length of the nail, combined with a carrier having a hardened-steel cutter and a co-operating stationary cutter to sever the wire at right angles to its length and place it in position to be driven, substantially as described.

In testimony whereof I have signed my name to this specification in the presence of two subscribing witnesses.

ALBION KNOWLTON.

Witnesses:
JOS. P. LIVERMORE,
N. E. C. WHITNEY.